US007806392B2

(12) United States Patent
Ishikawa

(10) Patent No.: US 7,806,392 B2
(45) Date of Patent: Oct. 5, 2010

(54) SPRING SHEET STRUCTURE OF HYDRAULIC SHOCK ABSORBER

(75) Inventor: Kenji Ishikawa, Gyoda (JP)

(73) Assignee: Showa Corporation, Gyoda-shi, Saitama (JP)

( * ) Notice: Subject to any disclaimer, the term of this patent is extended or adjusted under 35 U.S.C. 154(b) by 1427 days.

(21) Appl. No.: 11/221,992

(22) Filed: Sep. 8, 2005

(65) Prior Publication Data

US 2006/0131119 A1   Jun. 22, 2006

(30) Foreign Application Priority Data

Dec. 16, 2004 (JP) ............... 2004-365149
Mar. 15, 2005 (JP) ............... 2005-073963

(51) Int. Cl.
F16F 1/06 (2006.01)
F16F 7/00 (2006.01)

(52) U.S. Cl. ................... 267/179; 267/221
(58) Field of Classification Search ......... 267/221, 267/179, 202, 219, 220, 222
See application file for complete search history.

(56) References Cited

U.S. PATENT DOCUMENTS

| 1,390,948 | A | * | 9/1921 | Woodward ............. 152/105 |
| 3,010,714 | A | * | 11/1961 | Stresnak et al. ........... 267/221 |
| 4,441,593 | A | * | 4/1984 | Axthammer .......... 188/322.19 |
| 4,562,997 | A | * | 1/1986 | Iwata et al. ............... 267/221 |
| 4,793,597 | A | * | 12/1988 | Smith ..................... 267/33 |
| 5,299,786 | A | * | 4/1994 | Godin .................... 267/33 |
| 5,310,167 | A | * | 5/1994 | Noll, Jr. .................. 267/33 |
| 5,421,565 | A | * | 6/1995 | Harkrader et al. ........... 267/220 |
| 5,518,819 | A | * | 5/1996 | Shibahara et al. .......... 428/465 |
| 5,565,251 | A | * | 10/1996 | Tang et al. ............... 428/36.8 |
| 5,676,355 | A | * | 10/1997 | Hayashi et al. ............. 267/221 |
| 5,722,645 | A | * | 3/1998 | Reitter .................. 267/177 |
| 5,984,283 | A | * | 11/1999 | Tsuiki et al. ............. 267/33 |
| 6,260,836 | B1 | * | 7/2001 | Aoyama et al. ............ 267/221 |

(Continued)

FOREIGN PATENT DOCUMENTS

JP          6-22011          3/1994

(Continued)

OTHER PUBLICATIONS

Mechanical English translation of Japanese Patent Application 6-22011 filed Mar. 22, 1994, 19 pages.

(Continued)

Primary Examiner—Bradley T King
Assistant Examiner—Thomas Irvin
(74) Attorney, Agent, or Firm—Osha Liang LLP

(57) ABSTRACT

In a spring sheet structure of a hydraulic shock absorber having a sheet rubber seated on a spring sheet and supporting a spring through the sheet rubber, an end coil portion of the spring is stored in the sheet rubber, the spring sheet includes a movement restraint unit for restraining a movement of the sheet rubber, the sheet rubber includes an abutment unit corresponding to the movement restraint unit of the spring sheet, and the abutment unit of the sheet rubber is engaged with the movement restraint unit of the spring sheet while the sheet rubber is seated on a flat sheet surface provided in a circumferential direction of the spring sheet, thereby restraining a movement of the spring relative to the spring sheet.

15 Claims, 13 Drawing Sheets

U.S. PATENT DOCUMENTS

| | | | |
|---|---|---|---|
| 6,273,407 B1* | 8/2001 | Germano | 267/221 |
| 6,375,171 B1* | 4/2002 | Zimmermann et al. | 267/137 |
| 6,869,067 B2* | 3/2005 | Duval et al. | 267/220 |
| 6,883,651 B2* | 4/2005 | Fukaya | 188/322.12 |
| 7,090,058 B2* | 8/2006 | Miyazaki et al. | 188/322.12 |
| 7,360,776 B2* | 4/2008 | Bryant | 280/124.146 |

FOREIGN PATENT DOCUMENTS

| | | |
|---|---|---|
| JP | 8-200414 | 8/1996 |
| JP | 9-269027 | 10/1997 |
| JP | 2002-206583 | 7/2002 |

OTHER PUBLICATIONS

Patent Abstracts of Japan, Publication No. 2002-206583, Publication Date Jul. 26, 2002, 2 pages.

Patent Abstracts of Japan, Publication No. 08-200414, Publication Date Aug. 6, 1996, 2 pages.

Notice of Rejection issued in related Japanese Patent Application No. 2005-073963, dated Feb. 2, 2010, and English translation thereof, 6 pages.

English Abstract for Japanese Patent Application No. HEI 9-269027, Publication Date: Oct. 14, 1997, 1 page.

* cited by examiner

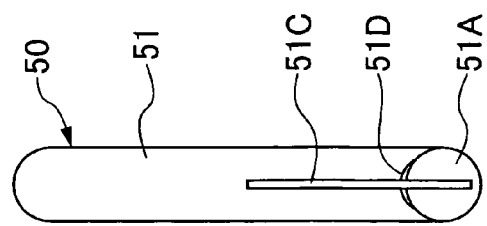
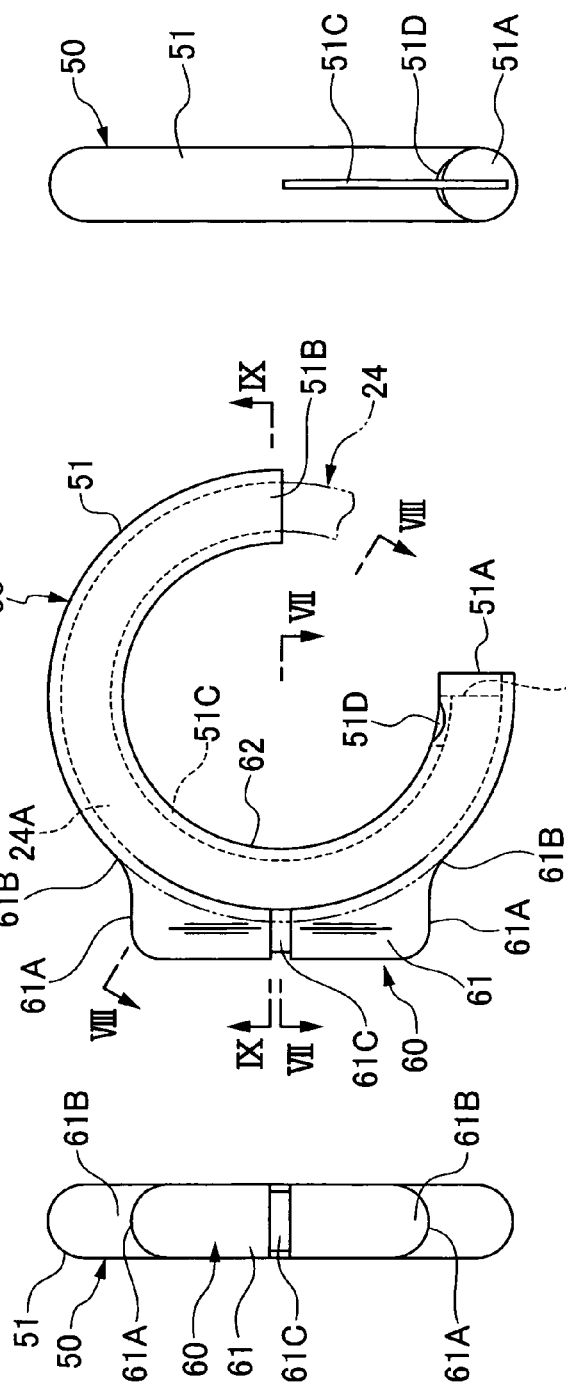
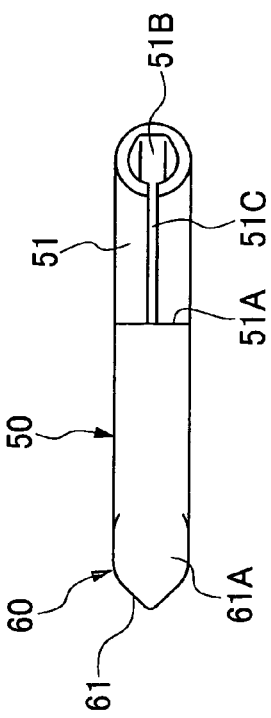

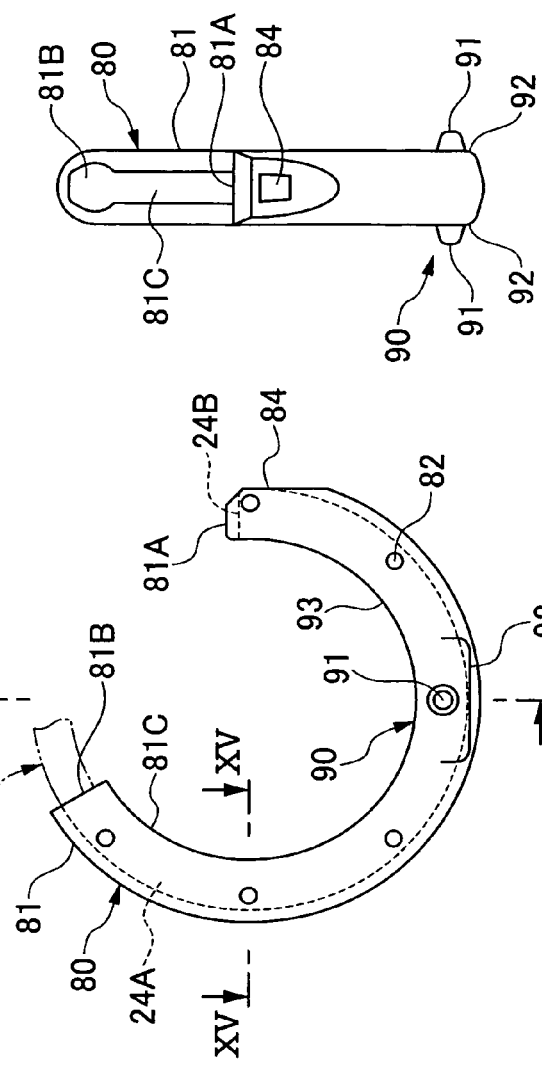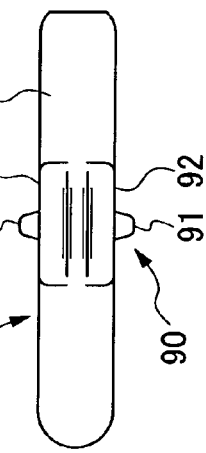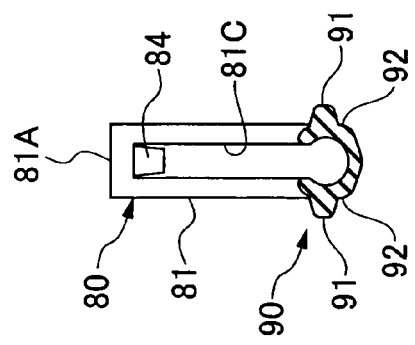

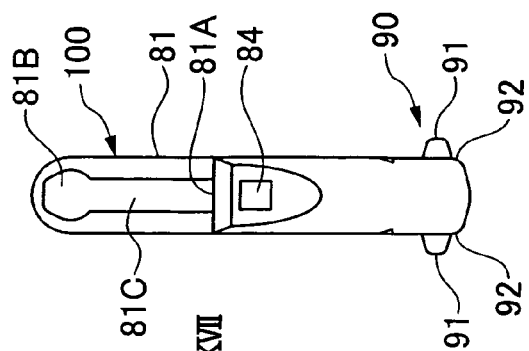
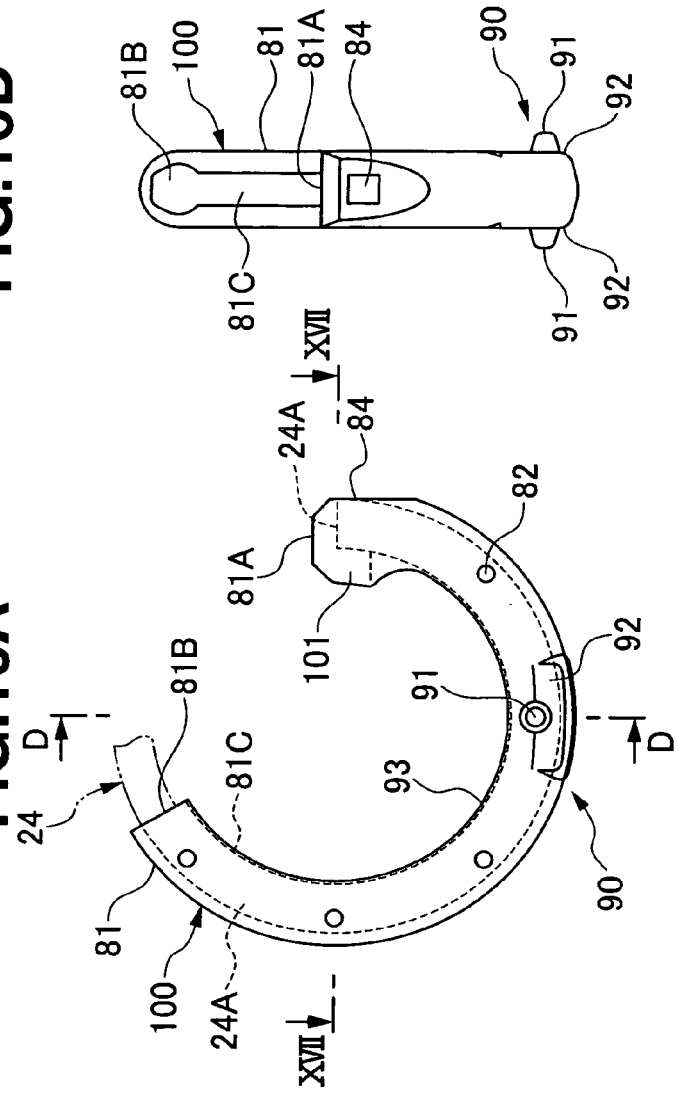
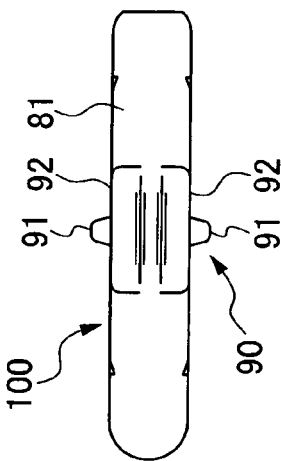
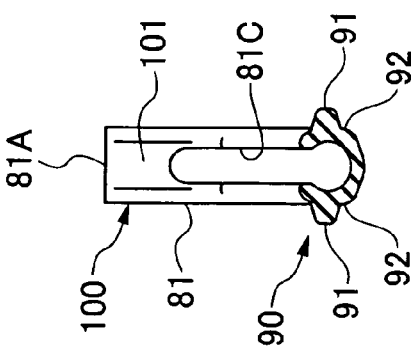

SPRING SHEET STRUCTURE OF HYDRAULIC SHOCK ABSORBER

BACKGROUND OF THE INVENTION

1. Field of the Invention

The present invention relates to a spring sheet structure of a hydraulic shock absorber.

2. Description of the Related Art

There is known a spring sheet structure of a hydraulic shock absorber, as disclosed in Japanese Patent Application Laid-Open No. 8-200414 (Patent document 1), configured so that a sheet rubber is seated on a spring sheet and supported through this sheet rubber. An end coil portion of a spring is stored in the sheet rubber, a terminal end of the end coil portion of the spring is arranged in a stepped portion provided at a circumferentially predetermined position of the sheet rubber, and the stepped portion of the sheet rubber is seated on a stepped portion provided at a circumferentially predetermined position on a sheet surface of the spring sheet. By this arrangement, rotation of the spring on its own axis is received by the stepped portion on the sheet surface of the spring sheet and thereby restrained.

With the spring sheet structure of the hydraulic shock absorber disclosed in the Patent document 1, the stepped portion is required to be provided at the circumferential predetermined position on the sheet surface of the spring sheet. This makes a shape of the spring sheet complicated, with the result that it disadvantageously takes lots of time to design the spring sheet and that manufacturing steps are disadvantageously complicated.

SUMMARY OF THE INVENTION

One or more embodiments of the present invention provide a spring sheet structure of a hydraulic shock absorber for preventing rotation of a spring, which structure enables simplifying a shape of a spring sheet and improving design efficiency and manufacturing efficiency.

In accordance with embodiments of the present invention, there is provided a spring sheet structure of a hydraulic shock absorber having a sheet rubber seated on a spring sheet and supporting a spring through the sheet rubber. An end coil portion of the spring is stored in the sheet rubber. The spring sheet includes movement restraint means for restraining a movement of the sheet rubber. The sheet rubber includes abutment means corresponding to the movement restraint means of the spring sheet. The abutment means of the sheet rubber is engaged with the movement restraint means of the spring sheet while the sheet rubber is seated on a flat sheet surface provided in a circumferential direction of the spring sheet, thereby restraining a movement of the spring relative to the spring sheet.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 6A, 6B, 6C, and 6D are a plan view, a front view, a left side view, and a right side view of a sheet rubber, respectively;

FIGS. 14A, 14B, 14C, and 14D are a plan view, a front view, a right side view, and a view taken along a line D-D of FIG. 14A of a sheet rubber, respectively;

FIGS. 16A, 16B, 16C, and 16D are a plan view, a front view, a right side view, and a view taken along a ling D-D of FIG. 16A of the sheet rubber according to a modification of the second embodiment, respectively.

DESCRIPTION OF THE PREFERRED EMBODIMENTS

First Embodiment (FIGS. 1 to 9)

Figure 1:
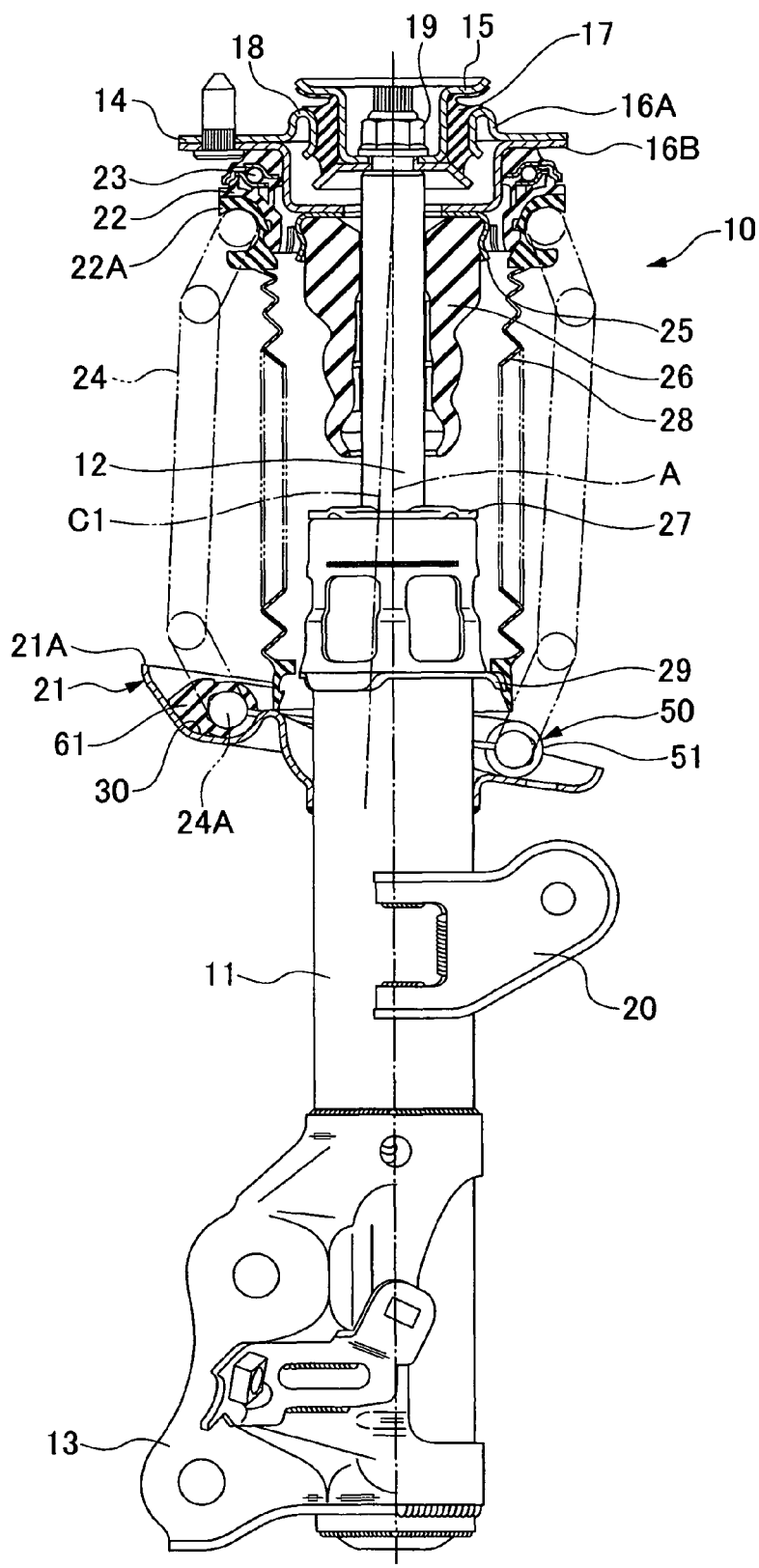
FIG. 1 is a front view that depicts a hydraulic shock absorber according to a first embodiment of the present invention.
Figure 2:
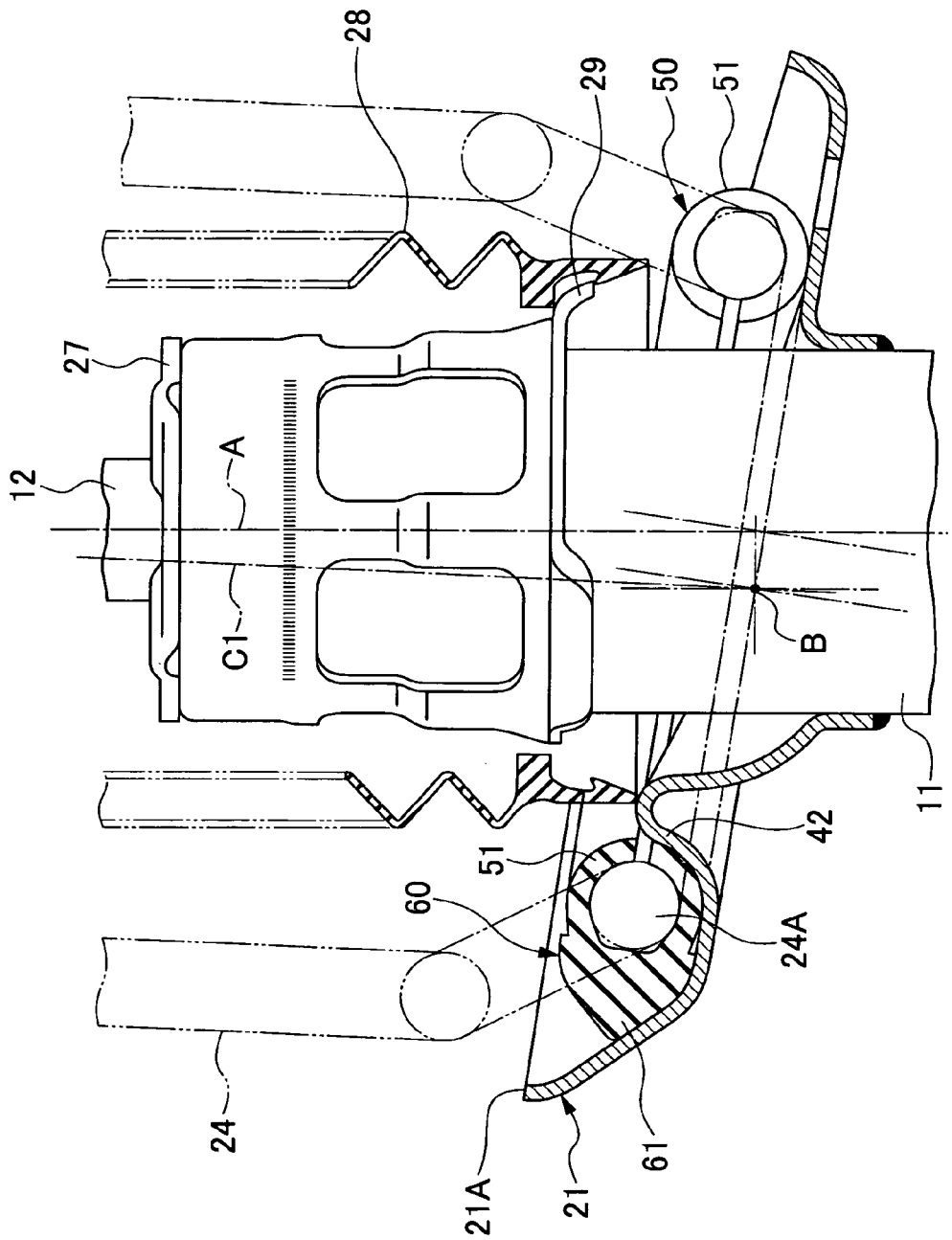
FIG. 2 is an enlarged view of important parts of the hydraulic shock absorber shown in FIG. 1.

A hydraulic shock absorber 10 is a strut damper type shock absorber. As shown in FIG. 1, the hydraulic shock absorber 10 is configured so that a piston rod 12 is inserted into a cylinder (not shown) included in an outer tube (damper tube) 11, the outer tube 11 is equipped with a wheel-side attachment bracket 13 and connected to a wheel, and so that the piston rod 12 protruding from the outer tube 11 is equipped with a vehicle body-side attachment bracket 14 and attached to a vehicle body. The vehicle body-side attachment bracket 14 includes a mount rubber assembly 18 that consists of a stay 15, upper and lower mount bases 16A and 16B, and a mount rubber 17. The stay 15 of this mount rubber assembly 18 is inserted into an upper end-side small-diameter portion of the piston rod 12 and fastened thereto by a nut 19.

A stabilizer attachment arm 20 is provided on the outer tube 11 and an end of a stabilizer (not shown) is connected to the stabilizer attachment arm 20, whereby the stabilizer (not shown) can be attached to the hydraulic shock absorber 10.

In the hydraulic shock absorber 10, the outer tube 11 and the piston rod 12 serve as an absorber main body, and a coil spring 24 is interposed between a lower spring sheet 21 fixed to an outer circumference of the outer tube 11 and an upper spring sheet 22 equipped with a thrust bearing 23, provided around the piston rod 12, fixed to the vehicle body-side attachment bracket 14 by low pressure fitting or the like, and having a back surface supported by the vehicle body-side attachment bracket 14. Specifically, the coil spring 24 is supported by the lower spring sheet 21 as will be described later, and supported by the upper spring sheet 22 through a sheet rubber 22A.

The hydraulic shock absorber 10 includes a rubber bumper 26 inserted and attached into a rubber bumper attachment body 25 welded to a lower surface of the vehicle body-side attachment bracket 14 so as to firmly embrace a lower portion of the piston rod 12 than the vehicle body-side attachment bracket 14. During maximum compression, the hydraulic shock absorber 10 restricts a maximum compression stroke by striking this rubber bumper 26 against a bumper stopper cap 27 provided on an upper end surface of the outer tube 11. In this embodiment, a dust cover 28 is formed integrally on a lower end of the sheet rubber 22A provided on the upper spring sheet 22. A lower end of the dust cover 28 is stopped by a cover reception portion 29 provided on the outer tube 11, and the outer tuber 11 and the piston rod 12 are covered with the dust cover 28.

Namely, the hydraulic shock absorber 10 is stretched so that an elastic force of the coil spring 24 can absorb a shock force which a vehicle receives from a road surface. During vertical movement of a piston (not shown) following the stretching of the hydraulic shock absorber 10, a stretching vibration is promptly suppressed by a damping force generated by a piston valve device provided on the piston, a base valve device provided on the cylinder, or the like.

The hydraulic shock absorber 10 is configured as follows (FIGS. 2 to 9) so as to seat a sheet rubber 50 on a sheet surface 30 of the lower spring sheet 21, and to support the coil spring 24 through this sheet rubber 50. It is noted that the coil spring 24 has an effective end coil portion 24A that has a three-quarter turn and has a coil central axis bent into a C shape.

(1) The coil spring 24 is arranged offset and inclined with respect to the outer tube 11 and the piston rod 12. Namely, in the front view of the hydraulic shock absorber 10 (FIG. 1), a central axis C1 of the coil spring 24 is arranged to be inclined (or may be arranged to be bent) from a central axis A of the outer tube 11 and the piston rod 12. In the plan view of the hydraulic shock absorber 10 (FIG. 3), the lower spring sheet 21 and the upper spring sheet 22 are arranged so that the central axis C1 of the coil spring 24 is offset with respect to the central axis A of the lower spring sheet 21 coaxial with the outer tube 11 (by as much as an offset amount "e"), and so that the central axis C1 of the coil spring 24 substantially coincides with the central axis A of the upper spring sheet 22 coaxial with the piston rod 12.

Figure 3:
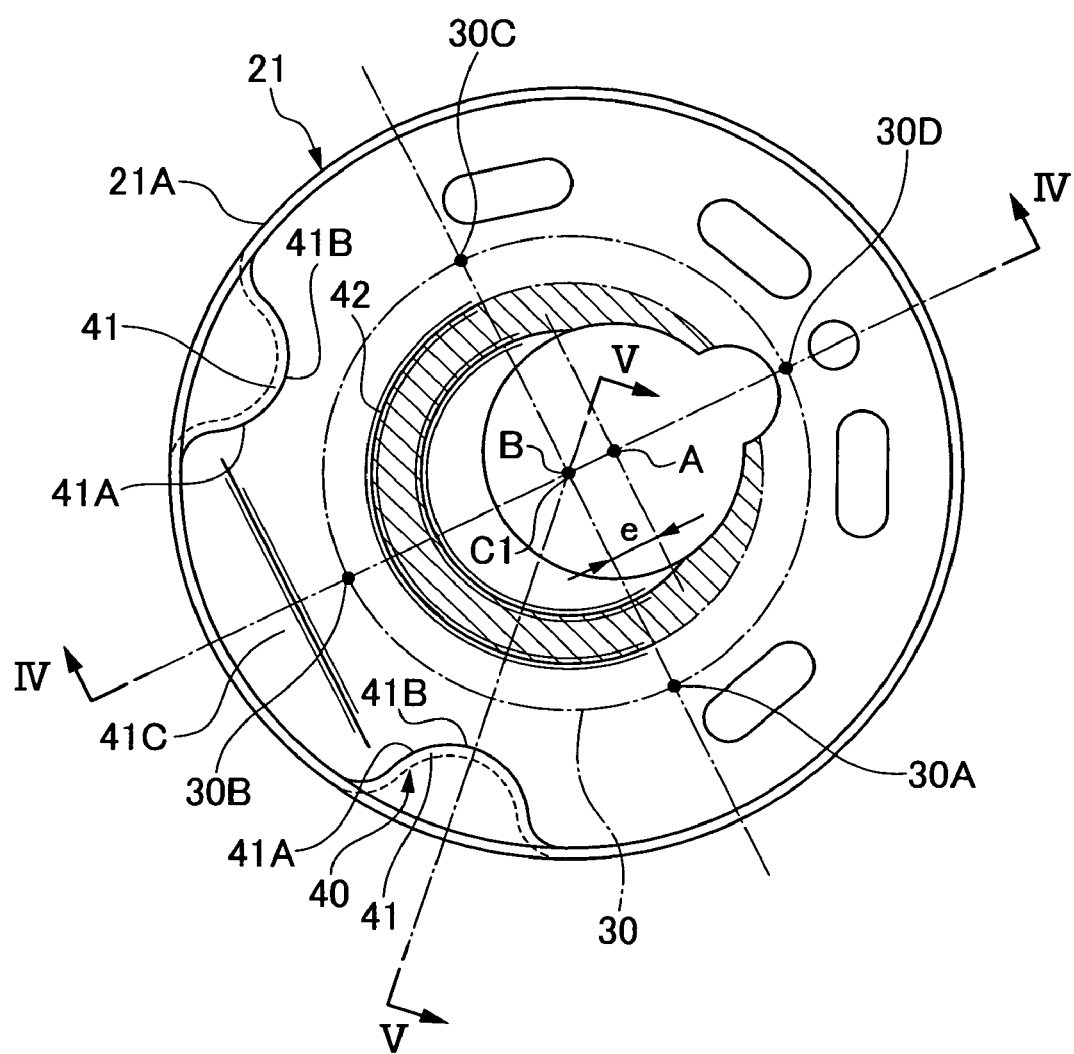
FIG. 3 is a plan view that depicts a spring sheet.
Figure 4:
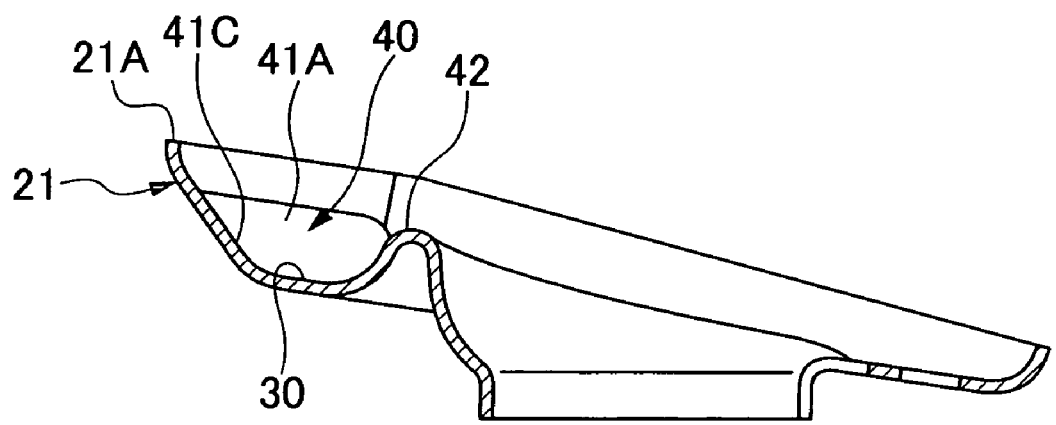
FIG. 4 is a sectional view of the spring sheet, taken along a line IV-IV of FIG. 3.
Figure 5:
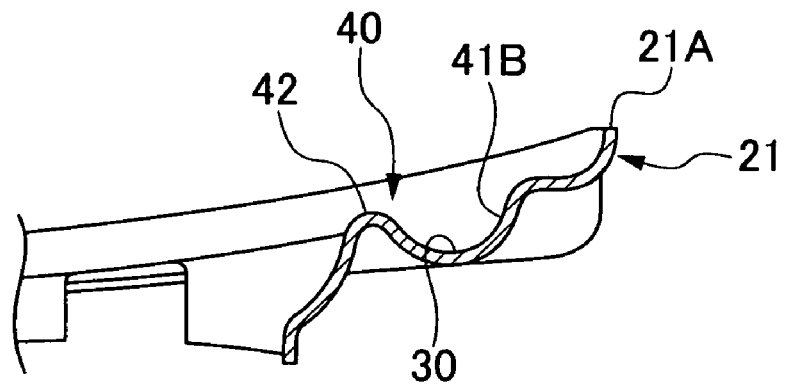
FIG. 5 is a sectional view of the spring sheet, taken along a line V-V of FIG. 3.
Figure 7:
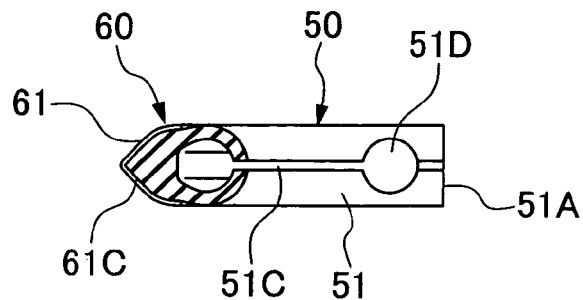
FIG. 7 is a sectional view of the sheet rubber, taken along a line VII-VII of FIG. 6A.
Figure 8:
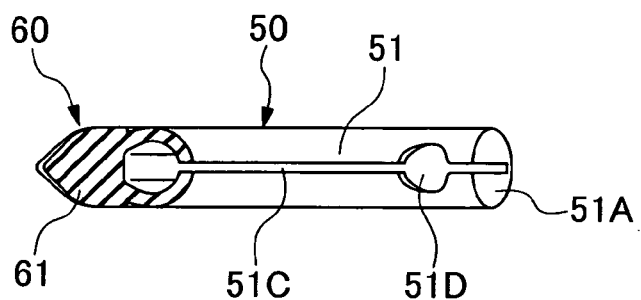
FIG. 8 is a sectional view of the sheet rubber, taken along a line VIII-VIII of FIG. 6A.
Figure 9:
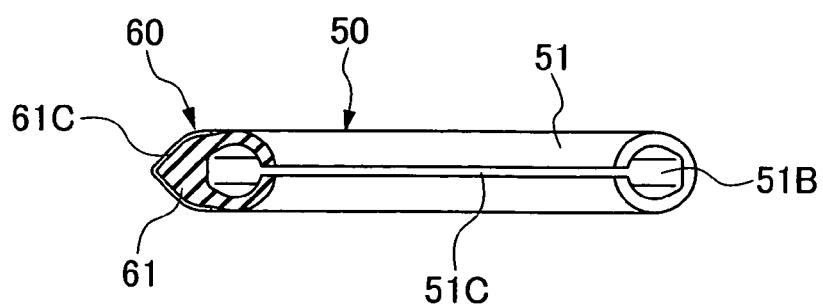
FIG. 9 is a sectional view of the sheet rubber, taken along a line IX-IX of FIG. 6A.
Figure 10:
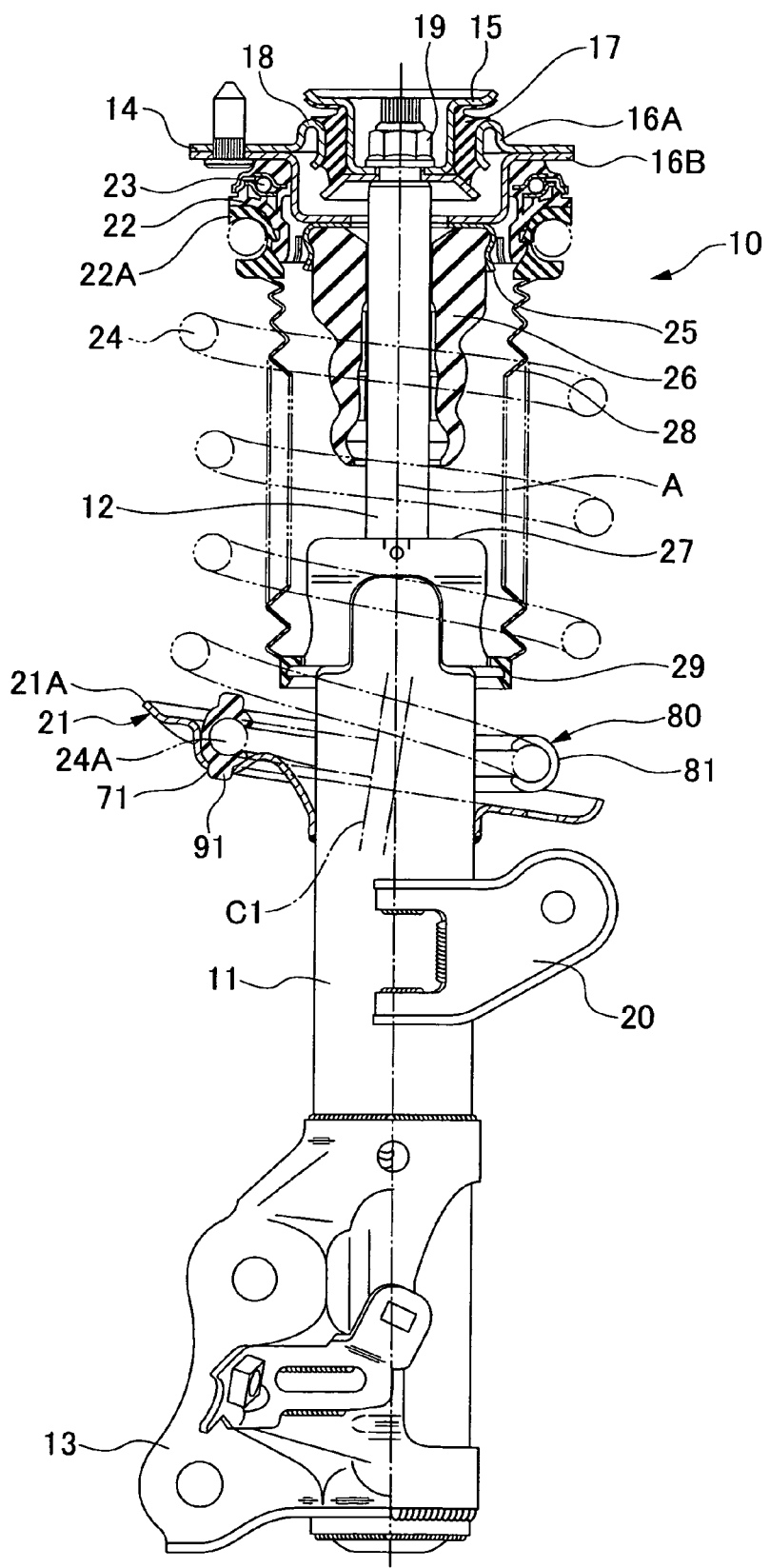
FIG. 10 is a front view that depicts a hydraulic shock absorber according to a second embodiment.

As shown in FIG. 3, therefore, the lower spring sheet 21 is in the form of a bowl surrounded by an outer circumferential rib 21A rising on an outer circumference of the lower spring sheet 21. The sheet surface 30 corresponding to the effective end coil portion 24A of the coil spring 24 is formed flat to spread over an entire circumference of the lower spring sheet 21. A spring starting end support portion 30A, a quarter turn support portion 30B, a half turn support portion 30C, and a three-quarter turn support portion 30D are provided on this sheet surface 30. The lower spring sheet 21 is configured as follows. The quarter turn support portion 30B is arranged inside of a vehicle body and the three-quarter turn support portion 30D is arranged outside of the vehicle body. The sheet surface 30 is an inclined flat surface having a falling gradient from the quarter turn support portion 30B to the three-quarter turn support portion 30D. In addition, a center B of the sheet surface 30 coincident with the central axis C1 of the coil spring 24 is offset with respect to the central axis A of the lower spring sheet 21 (which is also the central axis of the outer tube 11) (by as much as the offset amount "e").

The lower spring sheet 21 has a spring falling prevention flange 31 formed on an outside diameter-side entire circumference of the sheet surface 30, and has the outer circumferential rib 21A formed on an outer circumference of the spring falling prevention flange 31.

(2) The effective end coil portion 24A of the coil spring 24 is stored in the sheet rubber 50. As shown in FIGS. 6A to 6D and FIG. 7, the sheet rubber 50 consists of a rubber tube 51 seated on the flat sheet surface 30 provided on the circumference (entire circumference in this embodiment) of the spring sheet 21 and formed into a generally three-quarter circular arc on a single plane (a cross section of which tube orthogonal to a tube axis is circular). The sheet rubber 50 has a closed end 51A on one end of the circular arc of the rubber tube 51 and an opening portion 51B on the other end thereof. The sheet rubber 50 also includes a slit 51C ranging from the closed end 51A to be continuous to the opening portion 51B along an inner circumference of the circular arc of the rubber tube 51, and a bore 51D including the slit 51C and formed near the closed end 51A on the inner circumference of the circular arc of the rubber tube 51. A wire of the effective end coil portion 24A of the coil spring 24 is inserted and attached into the rubber tube 51 by elastically enlarging the slit 51C of the sheet rubber 50. A terminal 24B of the effective end coil portion 24A is abutted on the closed end 51A and the effective end coil portion (rising portion) of the coil spring 24 extends outward from the opening portion 51B. The bore 51D prevents the sheet rubber 50 from being torn off following enlargement of the slit 51C.

(3) As shown in FIGS. 2 to 5, the spring sheet 21 includes movement restraint means 40 for restraining movement of the sheet rubber 50 on the sheet surface 30.

The movement restraint means 40 has two protrusions 41 protruding in an inside diameter direction of the spring sheet 21 at two positions (between which the quarter turn support portion 30B is sandwiched) along the circumferential direction of the outer circumferential rib 21A provided on the spring falling prevention flange 31 on the outer circumference of the sheet surface 30 of the spring sheet 21 on which the end coil portion 24A of the coil spring 24 is seated, respectively. Inner wall surfaces 41A opposite each other of the both protrusions 41 will be referred to as "rotation restraint portions" that restrain rotation of the coil spring 24 (rotation on its own axis (coil axis) following compression of the coil spring 24). Protrusion apexes 41B of the both protrusions 41 will be referred to as "outside diameter restraint portions" that restrain the outside diameter of the coil spring 24.

The movement restraint portion 40 has an inner circumferential rib 42 extending in a range of a circular arc angle along the circumferential direction of the inner circumference of the sheet surface 30 of the spring sheet 21 on which surface the end coil portion 24A of the coil spring 24 is seated, which range corresponds to a range from the spring starting end support portion 30A to the half turn support portion 30C. This inner circumferential rib 42 will be referred to as "an inside diameter restraint portion" that restrains an inside diameter of the coil spring 24.

(4) Abutment means 60 corresponding to the movement restraint means 40 of the spring sheet 21 is provided on the sheet rubber 50.

The abutment means 60 has a projecting portion 61 which is generally rectangular in a plan view, which protrudes in an outside diameter direction of the sheet rubber 50, and which is provided on an outer circumference of the circular arc of the rubber tube 51 of the sheet rubber 50 (at a position corresponding to a range from the closed end 51A to a quarter turn portion of the coil spring 24). While the rubber tube 51 of the sheet rubber 50 is seated on the sheet surface 30 of the spring sheet 21, the projecting portion 61 of the rubber tube 51 is sandwiched and fitted between the both protrusions 41 of the spring sheet 21 and, therefore, held therebetween. Namely, a rotation force of the coil spring 24 generated when the coil spring 24 rotates on its own axis to follow compression of the coil spring 24 is transmitted from the terminal 24B of the coil spring 24 to the projecting portion 61 via the closed end 51A and the rubber tube 51 of the sheet rubber 50. Outer wall surfaces 61A on both sides of the projecting portion 61 along the circular arc of the rubber tube 51 will be referred to as "rotation direction abutment portions" engaged with the inner wall surfaces 41A (rotation restraint portions) of the both protrusions 41 of the spring sheet 21 in the rotation direction of the coil spring 24, respectively. In addition, both outer circumferential surfaces 61B that are a bottom of the projecting portion 61 will be referred to as "outside diameter direction abutment portions" engaged with the protrusion apexes 41B (outside diameter restraint portions) of the both protrusions 41 of the spring sheet 21 in a diameter direction of the coil spring 24, respectively.

Further, an inner circumferential surface 62 of the sheet rubber 50 which is an inner circumferential surface of the rubber tube 51 in a range from the closed end 51A, which range forms a half circular arc, will be referred to as "an inside diameter direction abutment portion" engaged with the inner circumference rib 42 of the spring sheet 21 in the diameter direction of the coil spring 24.

The projecting portion 61 of the sheet rubber 50 may be provided at an arbitrary position on the outer circumference of the circular arc of the rubber tube 51. However, if the coil spring 24 having the coil axis bent into C shape is used, then the end coil portion 24A forms an angle with respect to the sheet surface 30 when the sheet rubber 50 is seated on the sheet surface 30, and only a part of the end coil portion 24A can be strongly mounted on the sheet surface 30. In this case, the projecting portion 61 is preferably provided near a position at which the end coil portion 24A of the coil spring 24 is strongly mounted on the sheet surface 30 of the spring sheet 21 through the rubber tube 51.

The abutment means 60 is formed integrally with the rubber tube 51 when the sheet rubber 50 is formed, and dimensions of the abutment means 60 can be freely set. An outside surface groove 61C provided in an outside surface of a central portion of the projecting portion 61 along the circumferential direction of the rubber tube 51 coincides with a protrusion position confirmation mark given on a fitting bottom 41C of the spring sheet 21 on which the projecting portion 61 is sandwiched and fitted between the both protrusions 41 of the spring sheet 21.

(5) By thus configuring as stated in paragraphs (1) to (4) above, while the sheet rubber 50 into which the end coil portion 24A of the coil spring 24 is inserted and attached is seated on the flat sheet surface 30 provided on the spring sheet 21 in the circumferential direction thereof, the abutment means 60 (the rotation direction abutment portions 61A, the outside diameter direction abutment portions 61B, and the inside diameter direction abutment portion 62) of the sheet rubber 50 are engaged with the movement restraint means 40 (the rotation restraint portions 41A, the outside diameter restraint portions 41B, and the inside diameter restraint portion 42) of the spring sheet 21, respectively. This can thereby restrain free movement of the coil spring 24 relative to the spring sheet 21.

The number and positions of the protrusions 41 that constitute the movement restraint means 40 of the spring sheet 21 and those of the projecting portions 61 that constitute the abutment means 60 of the sheet rubber 50 can be arbitrarily set. If the coil spring 24 and the sheet rubber 50 cannot be surely and easily positioned by a single projecting portion 61, a plurality of projecting portions 61 can be employed.

By making the movement restraint means 40 provided on the spring sheet 21 and the abutment means 60 provided on the sheet rubber 50 different according to specifications of the hydraulic shock absorber 10 and the coil spring 24, it is possible to prevent erroneous combination of the coil spring 24 and the like.

One or more embodiments of a hydraulic shock absorber according to the first embodiment exhibit one or more of the following functions and advantages.

While the sheet rubber 50 is seated on the flat sheet surface 30 provided on the spring sheet 21 in the circumferential direction thereof, the abutment means 60 of the sheet rubber 50 is engaged with the movement restraint means 40 of the spring sheet 21. It is thereby possible to restrain the movement of the spring 24 relative to the spring sheet 21. Namely, the rotation of the spring 24 on its own axis following the compression of the spring 24 is transmitted to and received by the movement restraint means 40 of the spring sheet 21 through the abutment means 60 of the sheet rubber 50. The sheet surface 30 of the spring sheet 21 on which surface the sheet rubber 50 is seated can be, therefore, formed into a simple flat surface without any stepped portion.

Since the shape of the spring sheet 21 can be simplified, it is possible to simplify the designing and manufacturing of the hydraulic shock absorber such as abilities to promptly design the hydraulic shock absorber and to eliminate a pressing step in a manufacturing phase.

The movement restraint means 40 provided on the spring sheet 21 correspond to the protrusions 41 protruding in the diameter direction of the spring sheet 21. In addition, the abutment means 60 provided on the sheet rubber 50 correspond to the rotation direction abutment portions 61A and the diameter direction abutment portions 61B and 62. It is thereby possible to easily restrain the rotation and diameter direction movement of the spring 24 and to position the spring 24.

By making the movement restraint means 40 provided on the spring sheet 21 and the abutment means 60 provided on the sheet rubber 50 different according to the specifications of the coil spring 24 (and those of the hydraulic shock absorber 10), the spring sheet 21 and the sheet rubber 50 equal in specification can be combined. It is, therefore, possible to prevent erroneous combination of the spring sheet 21 and the sheet rubber 50.

The movement restraint means 40 provided on the spring sheet 21 and the abutment means 60 provided on the sheet rubber 50 are provided at a plurality of positions according to the specifications of the coil spring 24 (and those of the hydraulic shock absorber 10). It is thereby possible to use the spring sheet 21 and sheet rubber 50 common to a plurality of specifications and combine the spring sheet 21 and the sheet rubber 50 according to each specification. In addition, by using a plurality of movement restraint means 40 and the sheet rubber 50 in combination (simultaneously), it is possible to ensure that the movement of the spring 24 is restrained.

Second Embodiment (FIGS. 10 to 17)

A second embodiment differs from the first embodiment in movement restraint means 70 of a lower spring sheet 21, a sheet rubber 80, and abutment means 90 of the sheet rubber 80.

Namely, a hydraulic shock absorber 10 according to the second embodiment is configured as follows (FIGS. 10 to 15) so as to seat the sheet rubber 80 on a sheet surface 30 of the lower spring sheet 21, and to support a coil spring 24 through this sheet rubber 80. It is noted that the coil spring 24 has an effective end coil portion 24A that has a three-quarter turn and has a straight coil central axis.

(1) The coil spring 24 is arranged offset and inclined with respect to the outer tube 11 and the piston rod 12. Namely, in the front view of the hydraulic shock absorber 10 (FIG. 10), a central axis C1 of the coil spring 24 is arranged to be inclined (or may be arranged to be bent) from a central axis A of the outer tube 11 and the piston rod 12. In the plan view of the hydraulic shock absorber 10 (FIG. 12), the lower spring sheet 21 and the upper spring sheet 22 are arranged so that the central axis C1 of the coil spring 24 is offset with respect to the central axis A of the lower spring sheet 21 coaxial with the outer tube 11 (by as much as an offset amount "e"), and so that the central axis C1 of the coil spring 24 substantially coincides with the central axis A of the upper spring sheet 22 coaxial with the piston rod 12.

Figure 12:
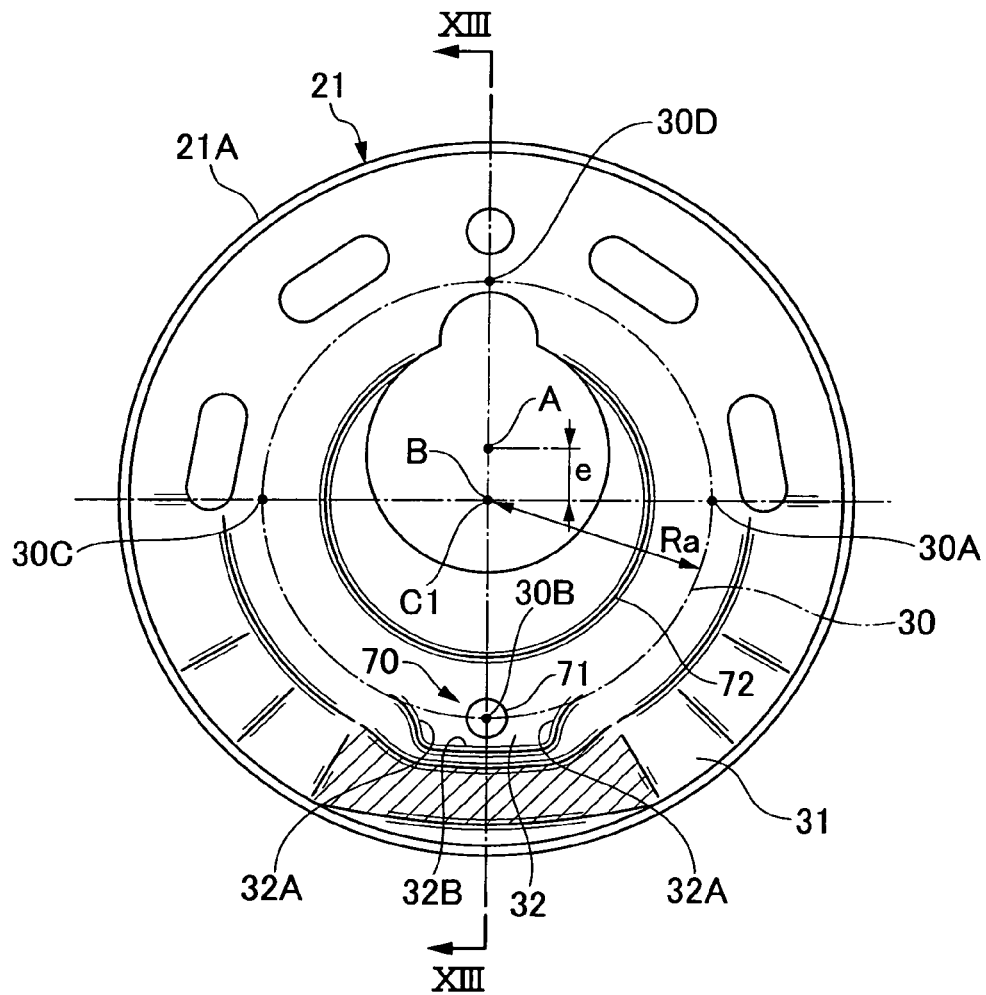
FIG. 12 is a plan view that depicts a spring sheet.

As shown in FIG. 12, therefore, the lower spring sheet 21 is in the form of a bowl surrounded by an outer circumferential rib 21A rising on an outer circumference of the lower spring sheet 21. The sheet surface 30 corresponding to the effective end coil portion 24A of the coil spring 24 is formed flat to spread over an entire circumference of the lower spring sheet 21. A spring starting end support portion 30A, a quarter turn support portion 30B, a half turn support portion 30C, and a three-quarter turn support portion 30D are provided on this sheet surface 30. The lower spring sheet 21 is configured as follows. The quarter turn support portion 30B is arranged inside of a vehicle body and the three-quarter turn support portion 30D is arranged outside of the vehicle body. The sheet surface 30 is an inclined flat surface having a falling gradient from the quarter turn support portion 30B to the three-quarter turn support portion 30D. In addition, a center B of the sheet surface 30 coincident with the central axis C1 of the coil spring 24 is offset with respect to the central axis A of the lower spring sheet 21 (which is also the central axis of the outer tube 11) (by as much as the offset amount "e").

(2) The effective end coil portion 24A of the coil spring 24 is stored in the sheet rubber 80. As shown in FIGS. 14A to 14D and FIG. 15, the sheet rubber 80 consists of a rubber tube 81 seated on the flat sheet surface 30 provided on the circumference (entire circumference in this embodiment) of the spring sheet 21 and formed into a generally three-quarter circular arc on a single plane (a cross section of which tube orthogonal to a tube axis is circular). The sheet rubber 80 has a closed end 81A on one end of the circular arc of the rubber tube 81 and an opening portion 81B on the other end thereof. The sheet rubber 80 also includes a slit 81C ranging from the closed end 81 to be continuous to the opening portion 81B along an inner circumference of the circular arc of the rubber tube 81. A wire of the effective end coil portion 24A of the coil spring 24 is inserted and attached into the rubber tube 81 by elastically enlarging the slit 81C of the sheet rubber 80. A terminal 24B of the effective end coil portion 24A is abutted on the closed end 81A and the effective end coil portion (rising portion) 24A of the coil spring 24 extends outward from the opening portion 81B.

Figure 11:
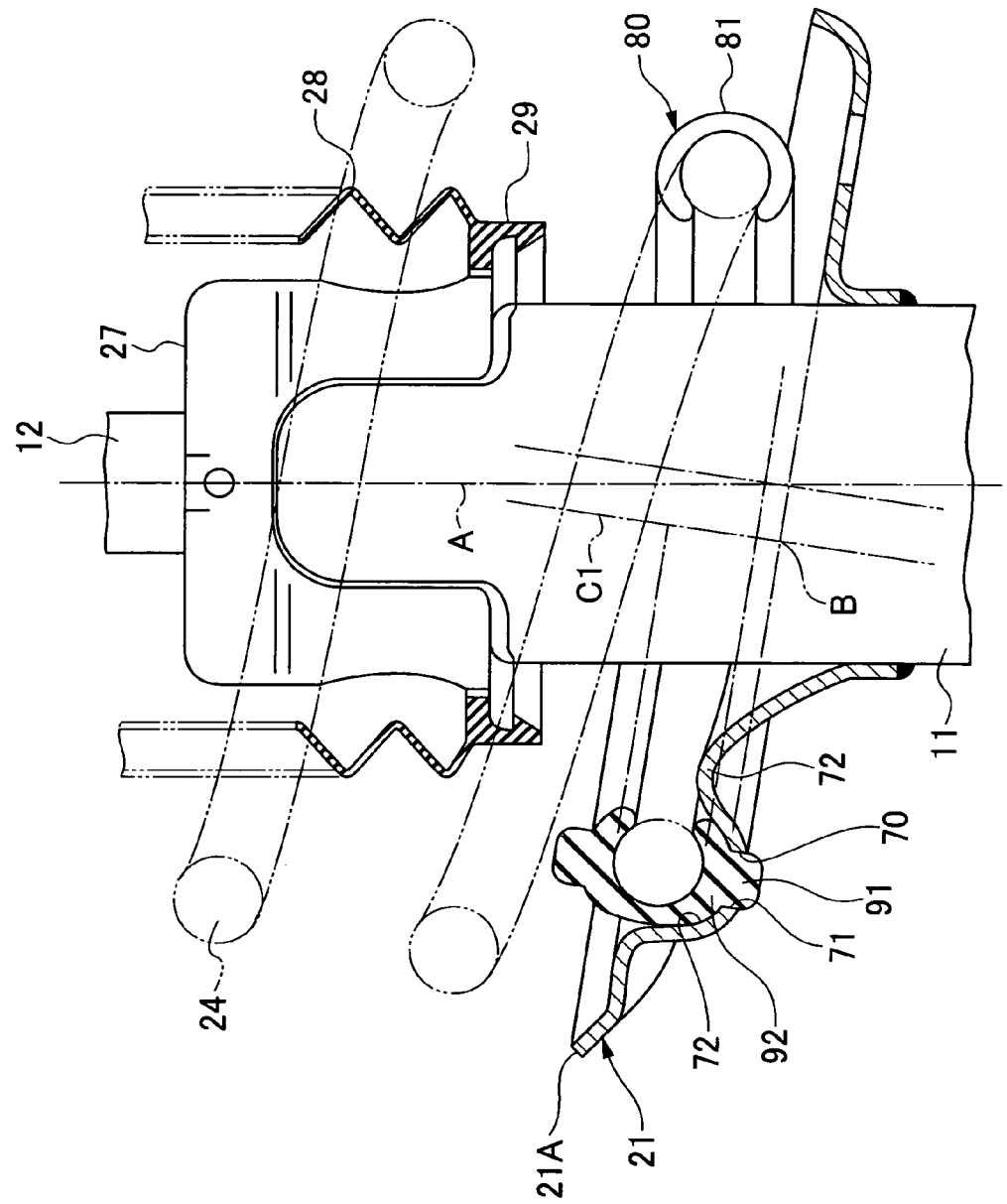
FIG. 11 is an enlarged view that depicts important parts of the hydraulic shock absorber shown in FIG. 10.
Figure 13:
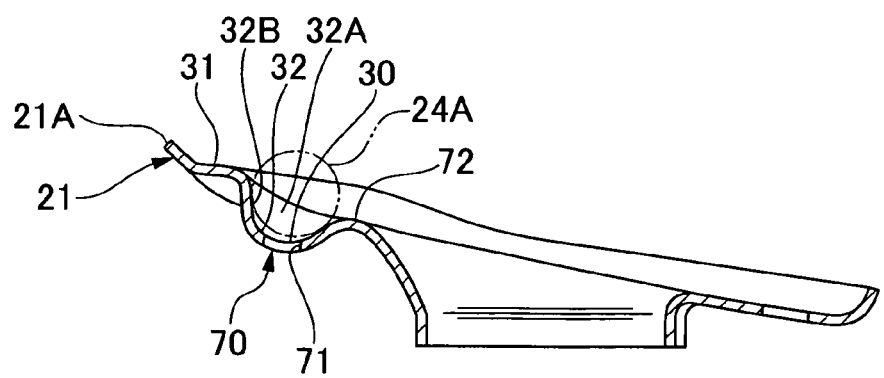
FIG. 13 is a sectional view of the spring sheet, taken along a line XIII-XIII of FIG. 12.
Figure 15:
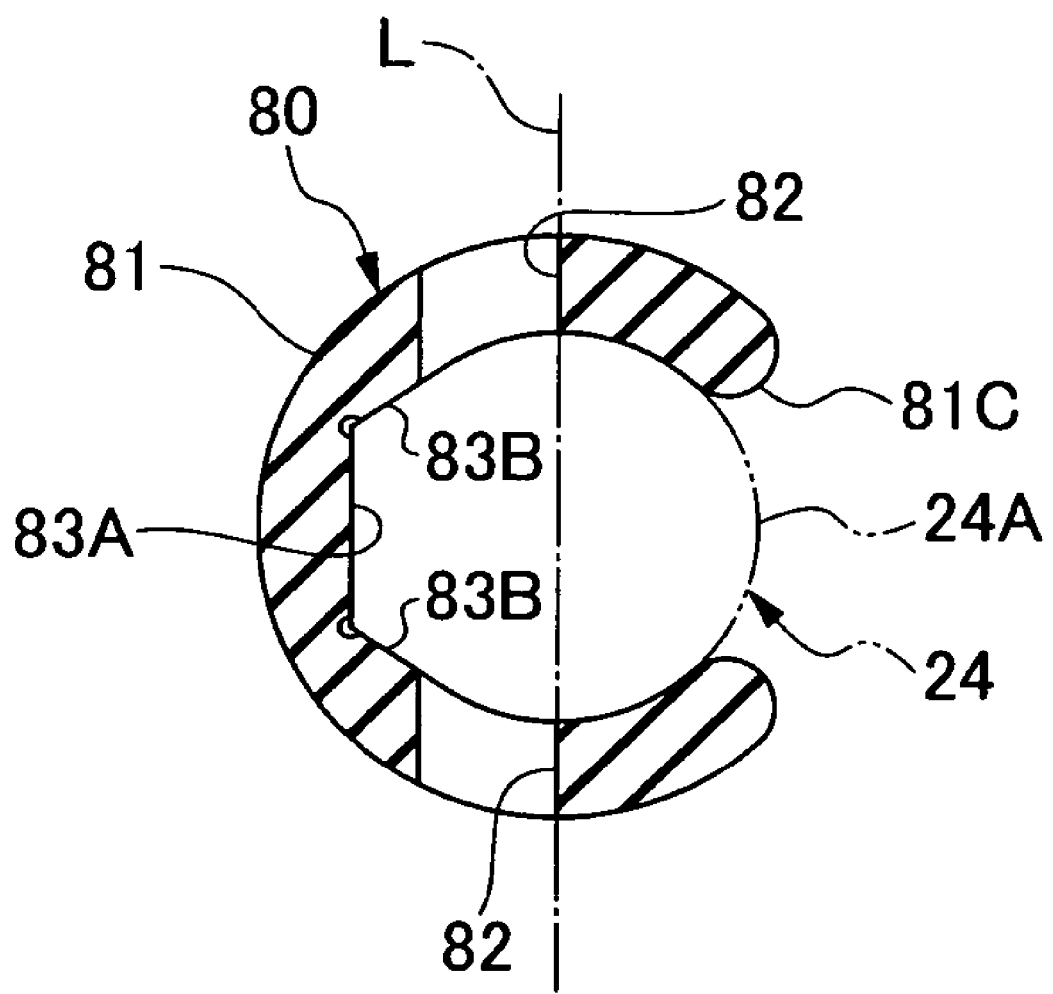
FIG. 15 is a sectional view of the sheet rubber, taken along a line XV-XV of FIG. 14A.
Figure 17:
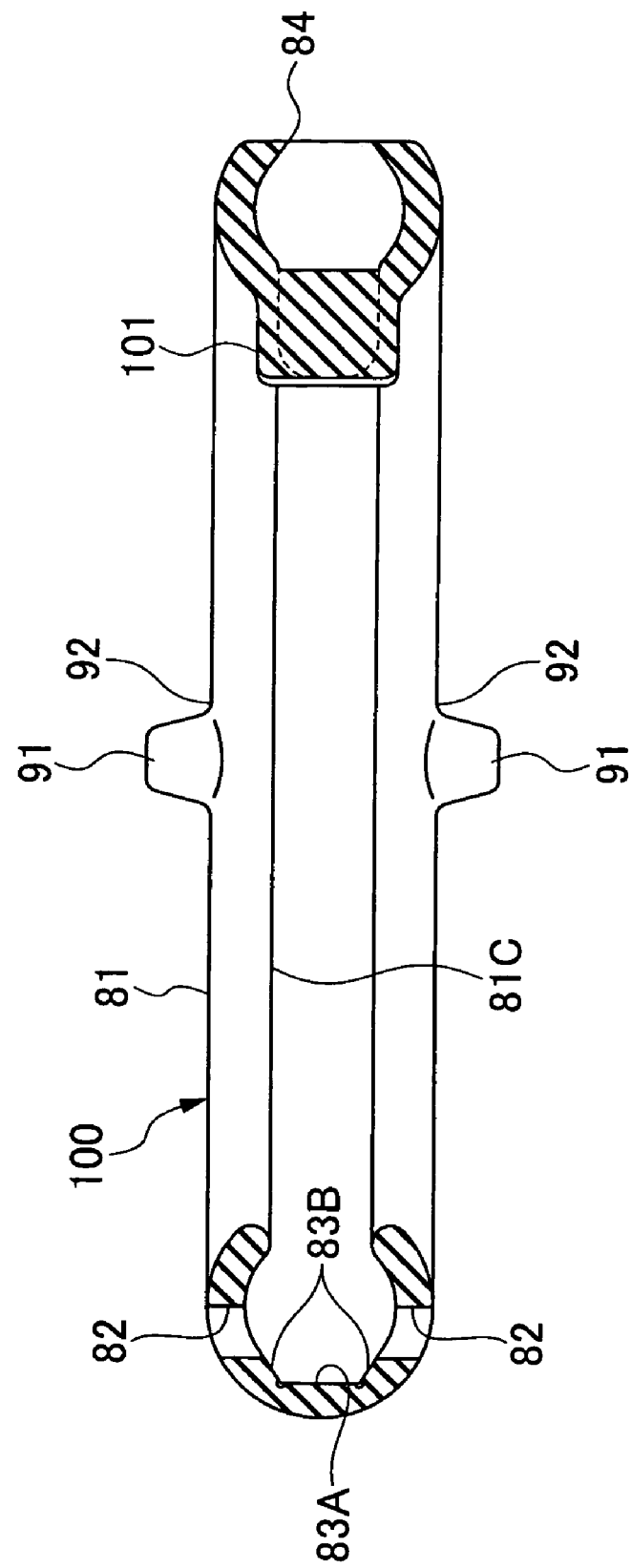
FIG. 17 is a sectional view of the sheet rubber, taken along a line XVII-XVII of FIG. 16A.

(3) As shown in FIGS. 11 to 13, the spring sheet 21 includes movement restraint means 70 for restraining movement of the sheet rubber 80 on the sheet surface 30.

The movement restraint means 70 has one bore 71 (or a plurality of bores) in the sheet surface 30 (the quarter turn support portion 30B) of spring sheet 21 on which the end coil portion 24A of the coil spring 24 is seated. This bore 71 will be referred to as "a restraint portion" that restrains rotation of the coil spring 24 on its own axis (rotation on the coil axis) and inside and outside diameter directions thereof following compression of the coil spring 24.

The sheet surface 30 around the bore 71 is formed into a flat surface 32 (FIGS. 12 and 13) for the movement restraint means 70 spreading outward (or both inward and outward) of the bore 71 in a diameter direction of the spring sheet 21. This flat surface 32 in the diameter direction extends toward a spring falling prevention flange 31 on an outer circumference of the sheet surface 30. Both wall surfaces 32A of the flat surface 32 opposite each other in the circumferential direction of the spring sheet 21 will be referred to as "rotation restraint portions" that constitutes the movement restraint means 70 and that restrain rotation of the coil spring 24. In addition, an outer wall surface 32B of the flat surface 32 located outward in the diameter direction of the spring sheet 21 will be referred to as "an outside diameter restraint portion" that constitutes the movement restraint means 70 and that restrains an outside diameter of the coil spring 24.

An inner circumferential rib 72 extending in a range of a circular arc angle along the circumferential direction of the inner circumference of the sheet surface 30 of the spring sheet 21 on which surface the end coil portion 24A of the coil spring 24 is seated, which range corresponds to a range from the spring starting end support portion 30A to the half turn support portion 30C. This inner circumferential rib 72 will be referred to as "an inside diameter restraint portion" that restrains an inside diameter of the coil spring 24.

(4) Abutment means 90 corresponding to the movement restraint means 70 of the spring sheet 21 is provided on the sheet rubber 80.

The abutment means 90 has a protrusion 91 which protrudes along an axial direction of a central axis of the circular arc of the rubber tube 81 of the sheet rubber 80 at a central axis of the wire of the end coil portion 24A of the coil spring 24 (a position distant from the center B of the sheet surface by a radius Ra and corresponding to a range from the closed end 81A to a quarter turn portion of the coil spring 24) on a lower surface of the circular arc, as shown in FIGS. 12, 13, and 14A. In addition, the abutment means 90 has a projecting portion 92 which is generally rectangular in a plan view, which protrudes in a certain range along the circular arc of the rubber tube 81 in an outside diameter direction of the sheet rubber 80, and which is provided on a circularly lower surface of the circular arc of the rubber tube 81 of the sheet rubber 80 on which the protrusion 91 is provided. The projecting portion 92 has a flat surface and the protrusion 91 protrudes to a center of the projecting portion 92.

While the rubber tube 81 of the sheet rubber 80 is seated on the flat sheet surface 30 of the spring sheet 21, the protrusion 91 of the rubber tube 81 is engaged and inserted into the bore 71 of the spring sheet 21 and, therefore, held therein. The projecting portion 92 of the rubber tube 81 is sandwiched and fitted between the both wall surfaces 32A of the flat surface 32 of the spring sheet 21 and, therefore, held therebetween. Namely, a rotation force of the coil spring 24 generated when the coil spring 24 rotates on its own axis to follow compression of the coil spring 24 is transmitted from the terminal 24B of the coil spring 24 to the protrusion 91 and the projecting portion 92 via the closed end 81A and the rubber tube 81 of the sheet rubber 80. Therefore, the protrusion 91 of the rubber tube 81 will be referred to as "an abutment portion" engaged with the bore 71 of the spring sheet 21 in the rotation direction and inside and outside diameter directions of the coil spring 24. In addition, the projecting portion 92 of the rubber tube 81 will be referred to as "an abutment portion" engaged with the outer wall surface 32B of the flat surface 32 of the spring sheet 21 in the outside diameter of the coil spring 24. As for the sheet rubber 80, it is essential to provide the protrusion 91 but not essential to provide the projecting portion 92.

Further, an inner circumferential surface 93 of the circular arc of the rubber tube 81 in a range from the closed end 81A to form a half circular arc will be referred to as "an inside diameter direction abutment portion" engaged with the inner circumference rib 72 of the spring sheet 21.

The protrusion 91 and the projecting portion 92 of the sheet rubber 80 may be provided at arbitrary positions on the outer circumference of the circular arc of the rubber tube 81. However, the end coil portion 24A of the coil spring 24 forms an angle with respect to the sheet surface 30 when the sheet rubber 80 is seated on the sheet surface 30, and only a part of the end coil portion 24A can be strongly mounted on the sheet surface 30. In this case, the protrusion 91 and the projecting portion 92 are preferably provided near a position at which the end coil portion 24A of the coil spring 24 is strongly mounted on the sheet surface 30 of the spring sheet 21 through the rubber tube 81.

The abutment means 90 is formed integrally with the rubber tube 81 when the sheet rubber 80 is formed, and dimensions of the abutment means 90 can be freely set. The protrusion 91 may be not only a round rod but also a long round rod, a rectangular rod or the like. By providing each of the protrusion 91 and the projecting portion 92 on upper and lower surfaces of the circular arc of the rubber tube 81, the spring sheet 21 and the sheet rubber 80 common to both left and right hydraulic shock absorbers 10 can be employed in.

The rubber tube 81 of the sheet rubber 80 has an inside diameter equal to a diameter of the wire of the coil spring 24. As shown in FIGS. 14A to 14D and 15, the rubber tube 81 includes drain holes 82 formed at a plurality of circumferential positions of upper and lower tube walls offset from a tube diameter L, which is orthogonal to a plane including the circular arc of the rubber tube 81 and on which the protrusion 91 is provided, toward an opposite side to the slit 81C, respectively. On the inner circumference of the rubber tube 81, an inside surface thereof facing the slit 81C is denoted as a flat surface 83A, and an inside surface thereof that connects the drain holes 82 to the flat surface 83A is denoted as a flat surface 83B biased with respect to the flat surface 83A. As a result, a gap that communicates an interior of the rubber tube 81 on the opposite side to the slit 81C with the drain holes 82 is formed.

The sheet rubber 80 includes a bore 84 provided near the closed end 81A provided on one end of the circular arc of the rubber tube 81 so as to confirm whether the end coil portion 24A of the coil spring 24 is inserted and attached into the rubber tube 81. The bore 84 is formed on the outer wall surface of the circular arc of the rubber tube 81. The bore 84 is set at the same position as an offset range from the closed end 81A allowed for a terminal of the end coil portion 24A when the end coil portion 24A of the coil spring 24 is inserted and attached into the rubber tube 81. Using the bore 84, it is confirmed whether the coil spring 24 is assembled with the sheet rubber 80.

(5) By thus configuring as stated in paragraphs (1) to (4) above, while the sheet rubber 80 into which the end coil portion 24A of the coil spring 24 is inserted and attached is seated on the flat sheet surface 30 provided on the spring sheet 21 in the circumferential direction thereof, the abutment means 90 (the protrusion 91 and the projecting portion 92) of the sheet rubber 80 are engaged with the movement restraint means 70 (the bore 71, the flat surface 32, and the inner circumferential rib 72) of the spring sheet 21, respectively. This can thereby restrain free movement of the coil spring 24 relative to the spring sheet 21.

The number and positions of the bores 71 that constitute the movement restraint means 70 of the spring sheet 21 and those of the protrusion 91 and the projecting portion 92 that constitute the abutment means 90 of the sheet rubber 80 can be arbitrarily set. If the coil spring 24 and the sheet rubber 80 cannot be surely and easily positioned by a single protrusion 91, a plurality of protrusions 91 can be employed.

By making the movement restraint means 70 provided on the spring sheet 21 and the abutment means 90 provided on the sheet rubber 80 different according to specifications of the hydraulic shock absorber 10 and the coil spring 24, it is possible to prevent erroneous combination of the coil spring 24 and the like.

One or more embodiments of a hydraulic shock absorber according to the second embodiment exhibit one or more of the following functions and advantages.

While the sheet rubber 80 is seated on the flat sheet surface 30 provided on the spring sheet 21 in the circumferential direction thereof, the abutment means 90 of the sheet rubber 80 is engaged with the movement restraint means 70 of the spring sheet 21. It is thereby possible to restrain the movement of the coil spring 24 relative to the spring sheet 21. Namely, the rotation of the coil spring 24 on its own axis following the compression of the coil spring 24 is transmitted to and received by the movement restraint means 70 of the spring sheet 21 through the abutment means 90 of the sheet rubber 80. The sheet surface 30 of the spring sheet 21 on which surface the sheet rubber 80 is seated can be, therefore, formed into a simple flat surface without any stepped portion.

Since the shape of the spring sheet 21 can be simplified, it is possible to simplify the designing and manufacturing of the hydraulic shock absorber such as abilities to promptly design the hydraulic shock absorber and to eliminate a pressing step in a manufacturing phase.

The movement restraint means 70 provided on the spring sheet 21 correspond to the bore 71. In addition, the abutment means 90 provided on the sheet rubber 80 correspond to the protrusion 91 engaged with and inserted into the bore 71. The simple configuration in which only the bore 71 is formed in the spring sheet 21 can, therefore, simplify the shape of the spring sheet 21, make the spring sheet 21 small in size and light in weight, and facilitate manufacturing the hydraulic shock absorber.

The protrusion 91 provided on the sheet rubber 80 is the protrusion along the axial direction of the sheet rubber 80 and engaged into and inserted into the bore 71 of the spring sheet 21. It is thereby possible to engage the sheet rubber 80 with the spring sheet 21 in the rotation and diameter directions of the coil spring 24. In addition, it is possible to easily restrain the rotation and diameter direction movement of the coil spring 24 and to position the coil spring 24.

Since the sheet rubber 80 consists of the rubber tube 81, the end coil portion 24A of the coil spring 24 can be easily and surely stored in the sheet rubber 80.

The drain holes 82 are formed in the rubber tube 81 of the sheet rubber 80 to be offset from the diameter of the rubber tube 81 toward the opposite side to the slit 81C. It is thereby possible to ensure draining water entering the rubber tube 81 without closing the drain holes 82 by the wire of the coil spring 24.

The bore 84 is provide in the rubber tube 81 of the sheet rubber 80 for confirming whether the end coil portion 24A of the coil spring 24 is inserted and attached into the rubber tube 81. It is, therefore, possible to confirm whether or not a state of inserting and attaching the end coil portion 24A of the coil spring 24 into the rubber tube 81 is good.

The spring falling prevention flange 31 is provided on the spring sheet 21, whereby the movement restraint means 70 for the sheet rubber 80 can be provided on this spring falling prevention flange 31.

By making the movement restraint means 70 provided on the spring sheet 21 and the abutment means 90 provided on the sheet rubber 80 different according to the specifications of the coil spring 24 (and those of the hydraulic shock absorber 10), the spring sheet 21 and the sheet rubber 50 equal in specification can be combined. It is, therefore, possible to prevent erroneous combination of the spring sheet 21 and the sheet rubber 80.

The movement restraint means 70 provided on the spring sheet 21 and the abutment means 90 provided on the sheet rubber 80 are provided at a plurality of positions according to the specifications of the coil spring 24 (and those of the hydraulic shock absorber 10). It is thereby possible to use the spring sheet 21 and sheet rubber 80 common to a plurality of specifications and combine the spring sheet 21 and the sheet rubber 80 according to each specification. In addition, by using a plurality of movement restraint means 70 and the sheet rubber 80 in combination (simultaneously), it is possible to ensure that the movement of the coil spring 24 is restrained.

A sheet rubber 100 according to a modification of the second embodiment shown in FIGS. 16A to 16D and FIG. 17 differs from the sheet rubber 80 according to the second embodiment shown in FIGS. 14A to 14D and FIG. 15 as follows. A protrusion 101 protruding in the diameter direction of the rubber tube 81 and abutting on the sheet surface 30 of the spring sheet 21 is provided near the closed end 81A provided on one end of the circular arc of the rubber spring 81. The protrusion 101 is provided on an inner circumferential wall of the circular arc of the rubber tube 81 and protrudes in the inside diameter direction of the circular arc of the rubber tube 81. A lower surface of the protrusion 100 (similarly to an upper surface thereof so as to employ the spring sheet 21 and the sheet rubber 80 common to both left and right hydraulic shock absorbers 10) is seated on the starting end support portion 30A of the spring sheet 21 to follow a curved surface of a range from the sheet surface 30 to the inner circumferential rib 72 along the diameter direction.

Accordingly, in the hydraulic shock absorber 10 using the sheet rubber 100, the sheet rubber 80 protrudes in the diameter direction of the rubber tube 81 and includes the protrusion 101 abutting on the sheet surface 30 of the spring sheet 21. It is, therefore, possible to prevent the rubber tube 81 from being distorted around the tube axis and becoming unstable in response to a torsional deformation of the wire of the coil spring 24 around the central axis thereof on the sheet surface 30 of the spring sheet 21.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the coil spring 24 is not limited to the coil spring having the coil axis formed into the C shape. A spring having a coil axis bent into an S shape or the like may be used. In that case, if the spring is sandwiched between the upper and lower spring sheets 21 and 22, a lateral force is generated by the spring itself. Further, a straight spring can be used as the coil spring 24.

A material for the sheet rubber may be an elastic material such as natural rubber (NR) or resin.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A spring sheet structure of a hydraulic shock absorber comprising a sheet rubber seated on a spring sheet and supporting a spring through the sheet rubber, wherein
   an end coil portion of the spring is stored in the sheet rubber,
   the spring sheet includes movement restraint means for restraining a movement of the sheet rubber,
   the sheet rubber includes abutment means corresponding to the movement restraint means of the spring sheet,
   the abutment means of the sheet rubber is engaged with the movement restraint means of the spring sheet while the sheet rubber is seated on a flat sheet surface provided in a circumferential direction of the spring sheet, thereby restraining a movement of the spring relative to the spring sheet,
   the sheet rubber comprises a rubber tube shaped into a circular arc on a single plane,
   the rubber tube has a closed end provided on one end of the circular arc and an opening portion provided on the other end of the circular arc, and includes a slit ranging from the closed end to be continuous to the opening portion along an inner circumference of the circular arc which enables a wire of the spring to be inserted into the rubber tube from the slit that is elastically enlargeable, and
   the rubber tube has a tube inside diameter equal to a diameter of the wire of the spring, and has a drain hole formed at a position offset toward an opposite side to the slit from a diameter of the rubber tube orthogonal to a plane including the circular arc.

2. The spring sheet structure of the hydraulic shock absorber according to claim 1, wherein
   the movement restraint means provided on the spring sheet is a protrusion protruding in a diameter direction of the spring sheet, and
   the abutment means provided on the sheet rubber is a rotation direction abutment portion and a diameter direction abutment portion engaged with the protrusion in rotation and diameter directions of the spring, respectively.

3. The spring sheet structure of the hydraulic shock absorber according to claim 1, wherein
   the movement restraint means provided on the spring sheet comprises a bore, and
   the abutment means provided on the sheet rubber is a protrusion engaged with and inserted into the bore.

4. The spring sheet structure of the hydraulic shock absorber according to claim 3, wherein
   the protrusion provided on the sheet rubber is a protrusion along an axial direction of the sheet rubber.

5. The spring sheet structure of the hydraulic shock absorber according to claim 1, wherein
   a wire of the end coil portion of the spring can be inserted into the rubber tube.

6. The spring sheet structure of the hydraulic shock absorber according to claim 5, wherein
the sheet rubber includes a bore near the closed end provided on the one end of the circular arc of the rubber tube so as to confirm a state of the end coil portion of the spring.

7. The spring sheet structure of the hydraulic shock absorber according to claim 5, wherein
the sheet rubber includes a protrusion provided near the closed end which is provided on a one end of the circular arc of the rubber tube, which protrudes in a diameter direction of the rubber tube, and which abuts on the sheet surface of the spring.

8. The spring sheet structure of the hydraulic shock absorber according to claim 1, wherein
the spring sheet includes a spring falling prevention flange provided on an outside diameter side of the flat sheet surface on which the sheet rubber is seated, and
the movement restraint means is provided on the spring falling prevention flange.

9. The spring sheet structure of the hydraulic shock absorber according to claim 1, wherein
the movement restraint means provided on the spring sheet and the abutment means provided on the sheet rubber are made different according to specifications of the spring.

10. The spring sheet structure of the hydraulic shock absorber according to claim 1, comprising at least one of the following:
a plurality of the movement restraint means on the spring sheet, and
a plurality of the abutment means on the sheet rubber,
wherein the movement restraint means and/or the abutment means are provided in a plurality of positions.

11. The spring sheet structure of the hydraulic shock absorber according to claim 2, wherein
the protrusion is two protrusions protruding in an inside diameter direction of the spring sheet,
inner wall surfaces of the two protrusions opposite each other serve as rotation restraint portions that restrain a rotation of the coil spring on an axis of the coil spring, and
protrusion apexes of the two protrusions serve as outside diameter restraint portions that restrain an outside diameter of the coil spring.

12. The spring sheet structure of the hydraulic shock absorber according to claim 11, wherein
the abutment means includes a projecting portion which is generally rectangular in a plan view, which protrudes in an outside diameter direction of the rubber tube, and which is provided on an outer circumference of the circular arc of the rubber tube of the sheet rubber, and
while the rubber tube is seated on the sheet surface of the spring sheet, the projecting portion of the rubber tube is sandwiched and fitted between the two protrusions of the spring sheet and thereby held between the two protrusions of the spring sheet.

13. The spring sheet structure of the hydraulic shock absorber according to claim 5, wherein
the abutment means includes a projecting portion which is generally rectangular in a plan view, which protrudes in an outside diameter direction of the circular arc of the rubber tube in a certain range along the circular arc of the rubber tube, and which is provided on a circularly lower surface of the circular arc on which the protrusion of the rubber tube of the sheet rubber is provided, the projecting portion having a flat surface, and the protrusion protruding through a center of the projecting portion.

14. The spring sheet structure of the hydraulic shock absorber according to claim 13, wherein
each of the protrusion and the projecting portion is provided on upper and lower surfaces of the circular arc of the rubber tube.

15. The spring sheet structure of the hydraulic shock absorber according to claim 1, wherein the abutment means provided on the sheet rubber comprises a protrusion engaged with and inserted into a bore.

* * * * *